United States Patent
Zhang et al.

(10) Patent No.: US 11,057,439 B2
(45) Date of Patent: *Jul. 6, 2021

(54) METHOD FOR CONFIGURING A PATH FOR INTERCEPTING USER DATA, METHOD FOR INTERCEPTING, APPARATUS AND ENTITY

(71) Applicant: Huawei Technologies Co., Ltd., Shenzhen (CN)

(72) Inventors: Jin Zhang, Shanghai (CN); Shiyong Tan, Beijing (CN); Weihua Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

This patent is subject to a terminal disclaimer.

(21) Appl. No.: 16/109,380

(22) Filed: Aug. 22, 2018

(65) Prior Publication Data
US 2018/0367380 A1 Dec. 20, 2018

Related U.S. Application Data

(63) Continuation of application No. 14/716,095, filed on May 19, 2015, which is a continuation of application No. PCT/CN2012/084835, filed on Nov. 19, 2012.

(51) Int. Cl.
*H04L 12/24* (2006.01)
*H04L 12/26* (2006.01)
(Continued)

(52) U.S. Cl.
CPC ............ *H04L 63/306* (2013.01); *H04L 12/66* (2013.01); *H04L 41/0803* (2013.01);
(Continued)

(58) Field of Classification Search
CPC ....... H04L 63/30; H04L 63/306; H04L 65/10; H04L 12/66; H04L 41/0803; H04L 43/028

See application file for complete search history.

(56) References Cited

U.S. PATENT DOCUMENTS 10,153,942 B2 * 12/2018 Zhang ................... H04L 43/028
2002/0049913 A1 4/2002 Lumme et al.
(Continued)

FOREIGN PATENT DOCUMENTS

CN 1523860 A 8/2004
CN 1852179 A 10/2006
(Continued)

OTHER PUBLICATIONS

"3rd Generation Partnership Project; Technical Specification Group Services and System Aspects; General Packet Radio Service (GPRS); Service description; Stage 2(Release 11)," 3GPP TS 23.060 V11.3.0, pp. 1-333, 3rd Generation Partnership Project, Valbonne, France (Sep. 2012).

(Continued)

*Primary Examiner* — Kevin C. Harper
(74) *Attorney, Agent, or Firm* — Leydig, Voit & Mayer, Ltd.

(57) ABSTRACT

A method for configuring a path for intercepting user data, a method for intercepting user data, an apparatus, a system, a control plane entity and a user plane entity are provided. The method for configuring the path for intercepting user data comprises: acquiring a target to be intercepted and an intercepting interface address; configuring data path configuration information on a user plane entity GW-U according to the target to be intercepted and the intercepting interface address; sending the data path configuration information to the user plane entity GW-U so that the GW-U establishes a path for data transmission; initiating an establishment of an intercepting connection of an intercepting interface to an intercepting entity based on the intercepting interface address so as to transmit the data of the target to be intercepted.

20 Claims, 9 Drawing Sheets

(51) Int. Cl.
*H04L 29/06* (2006.01)
*H04L 12/66* (2006.01)

(52) U.S. Cl.
CPC ............ *H04L 41/12* (2013.01); *H04L 43/028* (2013.01); *H04L 65/10* (2013.01)

(56) References Cited

U.S. PATENT DOCUMENTS

| | | |
|---|---|---|
| 2004/0157629 A1 | 8/2004 | Kallio et al. |
| 2005/0152275 A1 | 7/2005 | Laurila et al. |
| 2006/0120171 A1 | 6/2006 | Touati et al. |
| 2008/0170117 A1* | 7/2008 | Xiao ............... H04L 65/1076 348/14.12 |
| 2008/0275988 A1 | 11/2008 | Zheng |
| 2008/0285464 A1 | 11/2008 | Katzir |
| 2010/0039946 A1 | 2/2010 | Imbimbo et al. |
| 2010/0080127 A1 | 4/2010 | Yin et al. |
| 2010/0142389 A1 | 6/2010 | Imbimbo et al. |
| 2011/0141947 A1 | 6/2011 | Li et al. |
| 2011/0149808 A1 | 6/2011 | Yared |
| 2012/0069971 A1 | 3/2012 | Jayaraman et al. |
| 2013/0326631 A1* | 12/2013 | Cartmell ............... H04W 12/02 726/26 |

FOREIGN PATENT DOCUMENTS

| | | |
|---|---|---|
| CN | 101005409 A | 7/2007 |
| CN | 101218785 A | 7/2008 |
| CN | 101321360 A | 12/2008 |
| CN | 102577480 A | 7/2012 |
| WO | 02093838 A1 | 11/2002 |
| WO | 2010145685 A1 | 12/2010 |
| WO | 2012009619 A2 | 1/2012 |
| WO | 2012097870 A1 | 7/2012 |

OTHER PUBLICATIONS

"3rd Generation Partnership Project; Technical Specification Group Services and System Aspects; 3G security; Lawful interception architecture and functions(Release 12)," 3GPP TS 33.107 V12.0.0, pp. 1-145, 3rd Generation Partnership Project, Valbonne, France (Sep. 2012).

* cited by examiner

METHOD FOR CONFIGURING A PATH FOR INTERCEPTING USER DATA, METHOD FOR INTERCEPTING, APPARATUS AND ENTITY

CROSS-REFERENCE TO RELATED APPLICATIONS

This application is a continuation of U.S. patent application Ser. No. 14/716,095, filed on May 19, 2015, which is a continuation of International Patent Application No. PCT/CN2012/084835, filed on Nov. 19, 2012, All of the aforementioned patent applications are hereby incorporated by reference in their entireties.

TECHNICAL FIELD

Embodiments of the present invention relate to field of communication technology, and in particular relates to a method for configuring a path for intercepting user data, a method for intercepting user data, an apparatus, a system, a control plane entity and a user plane entity.

BACKGROUND

With development of communication technology, an idea of separating a control plane of a gateway from a user plane thereof is proposed so as to simplify design of a hardware platform and reduce cost of the hardware platform, which is beneficial to accelerate deployment of a mobile packet data network. The original gateway can be separated into: a network gateway-control (GW-C) entity of the gateway and a network gateway-user (GW-U) entity (i.e. forward plane entity) thereof. Wherein, it is concerned that both the GW-C entity and a mobility management entity (MME/SGSN) adopt a general computer platform, therefore, they can be integrated together, and also can be separately arranged.

Before the separation, the gateway (including the GW-C and the GW-U) is connected with a lawful interception center (LIC) or a law enforcement agency (LEA) through an interface X1, an interface X2 and an interface X3, wherein, the X1 interface is configured to perform an access authentication by the gateway for the LIC/LEA and set monitoring information of a target to be intercepted; wherein, the monitoring information of the target to be intercepted includes at least one event of the following events: activation, update and deactivation of a PDP context/bearing context, user access report, tunnel built and tunnel released, which need to be reported by the X2 interface. The monitoring information can further include reporting user data content of lawful interception content tunnel (LICT) of the X3 interface. The monitoring information can further include information of the target to be intercepted, which includes an identifier of the target to be intercepted; the X3 interface is configured to report data content information of a UE device to the LEA or the LIC; that is to say, the gateway can report the data content information of the UE device to the LEA or the LIC through messages.

After the separation of the control plane entity and the user plane entity of the gateway, the intercepting interface of the LEA or the LIC is provided on the control plane entity, but uplink data of the user equipment UE are forwarded to a PDN through the user plane entity; the downlink user data of the PDN are forwarded to the UE through the user plane entity. However, if the interfaces X1, X2 and X3 are all provided on the control plane entity, the user plane entity cannot report the data content information of the user to the LEA or the LIC through the interface X3. If the user plane entity forwards the data of the target to be intercepted, the user equipment, to the control plane entity, and the data are reported to the LEA or the LIC by the control plane entity through the X3 interface thereon, then the control plane entity needs to reserve a data forwarding function, which results in a complex structure of the control plane entity and greatly increased cost.

During research and practice with respect to the conventional art, the inventor of the present invention has found that in the present implementing manners, how to avoid a complex structure of the control plane entity and how to reduce data flow of the target to be intercepted between the control plane entity and the user plane entity are the technical problems to be solved at present.

SUMMARY

Embodiments of the present invention provide a method for intercepting user data, an apparatus, a system for intercepting user data, a control plane entity and a user plane entity, in order to solve the technical problems of a complex structure of the control plane entity and increasing cost, which are caused by increasing data flow of the target to be intercepted transmitted between the control plane entity and the user plane entity, in an architecture in which the control plane entity and the user plane entity are separated.

In order to solve the foregoing problems, the embodiments of the present invention provide the following technical solutions:

One aspect provides a method for configuring a path for intercepting user data, including:

acquiring, by a control plane entity GW-C, a target to be intercepted and an intercepting interface address;

configuring, by the GW-C, data path configuration information on a user plane entity GW-U according to the target to be intercepted and the intercepting interface address;

sending, by the GW-C, the data path configuration information to the user plane entity GW-U so that the GW-U establishes a path for data transmission; and initiating, by the GW-C, an establishment of an intercepting connection of an intercepting interface to an intercepting entity based on the intercepting interface address so as to transmit data of the target to be intercepted.

Optionally, the acquiring, by the GW-C, the target to be intercepted and the intercepting interface address includes:

the GW-C receives a request of configuring the target to be intercepted sent by the intercepting entity, the request of configuring the target to be intercepted includes the target to be intercepted and the intercepting interface address; or the GW-C receives a request of configuring the target to be intercepted sent by the intercepting entity, the request of configuring the target to be intercepted includes the target to be intercepted and an identifier of the intercepting entity; converts the identifier of the intercepting entity, obtains a converted identifier, and uses the converted identifier as the intercepting interface address.

Optionally, the sending, by the GW-C, the data path configuration information to the user plane entity GW-U includes:

the GW-C sends the data path configuration information to the user plane entity GW-U through a message of configuring a data path; or the GW-C sends the target to be intercepted and the intercepting interface address in the data path configuration information to the user plane entity GW-U through different messages.

Optionally, after the GW-C acquires the target to be intercepted and the intercepting interface address, the method further includes:

the GW-C judges whether a connection of the target to be intercepted has already been established, if not, the GW-C executes the step of sending the data path configuration information to the user plane entity GW-U; if yes, the GW-C modifies the data path configuration information, and sends the modified data path configuration information to the GW-U so that the GW-U modifies the path for data transmission which has already been established.

Optionally, the intercepting interface address is an address of an X3 interface on the GW-U.

Optionally, the method further includes:

the GW-C allocates a connection identifier of the intercepting interface for the intercepting connection;

the GW-C sends the connection identifier to the user plane entity GW-U.

Optionally, after the GW-C acquires the target to be intercepted and the intercepting interface address, the method further includes:

the GW-C acquires encryption information of the intercepting connection, the encryption information is configured to encrypt data of the target to be intercepted;

the GW-C sends the encryption information to the GW-U.

A second aspect provides a method for intercepting user data, including:

receiving, by a user plane entity GW-U, data path configuration information sent by a control plane entity GW-C, the data path configuration information includes: a target to be intercepted and an intercepting interface address;

establishing, by the GW-U, a path for data transmission according to the data path configuration information;

intercepting, by the GW-U, data transmitted by the target to be intercepted on the path, and sending the data to an intercepting entity through the intercepting interface address.

Optionally, the receiving, by the GW-U, data path configuration information sent by the GW-C specifically includes:

GW-U receives the data path configuration information sent by the GW-C through a message of configuring a data path; or, the GW-U receives the target to be intercepted and the intercepting interface address in the data path configuration information sent by the GW-C through different messages.

Optionally, after the receiving, by the GW-U, data path configuration information sent by the GW-C, if a connection of the target to be intercepted has already been established, the method further includes:

the GW-U receives modified data path configuration information sent by the GW-C;

the GW-U modifies a path for data transmission which has already been established according to the modified data path configuration information.

Optionally, the method further includes: the GW-U receives a connection identifier of the intercepting interface, which is allocated for an intercepting connection, sent by the GW-C;

the GW-U sends the data to the intercepting entity according to the connection identifier.

Optionally, the method further includes: the GW-U allocates a connection identifier of the intercepting interface for the intercepting connection;

the GW-U sends the connection identifier to the GW-C.

Optionally, the method further includes:

the GW-U receives encryption information sent by the GW-C;

the GW-U encrypts the intercepted data using the encryption information;

the GW-U sends the encrypted data to the intercepting entity through the intercepting connection.

A third aspect provides an apparatus for configuring a path for intercepting user data, including:

a first acquiring unit, configured to acquire a target to be intercepted and an intercepting interface address;

a configuring unit, configured to configure data path configuration information on a user plane entity GW-U according to the target to be intercepted and the intercepting interface address;

a first sending unit, configured to send the data path configuration information to the user plane entity GW-U so that the GW-U establishes a path for data transmission;

an establishing unit, configured to initiate an establishment of an intercepting connection of an intercepting interface to an intercepting entity based on the intercepting interface address so as to transmit data of the target to be intercepted.

Optionally, the first acquiring unit includes: a first receiving unit; and/or includes: a second receiving unit and a converting unit, wherein, the first receiving unit is configured to receive a request of configuring the target to be intercepted sent by the intercepting entity, the request of configuring the target to be intercepted includes the target to be intercepted and the intercepting interface address;

the second receiving unit is configured to receive a request of configuring the target to be intercepted sent by the intercepting entity, the request of configuring the target to be intercepted includes the target to be intercepted and an identifier of the intercepting entity;

the converting unit is configured to convert the identifier of the intercepting entity, obtain a converted identifier, and use the converted identifier as the intercepting interface address.

Optionally, the first sending unit includes:

a first information sending unit, configured to send the data path configuration information to the user plane entity GW-U through a message of configuring a data path; or a second information sending unit, configured to send the target to be intercepted and the intercepting interface address in the data path configuration information to the user plane entity GW-U through different messages.

Optionally, the apparatus further includes:

a judging unit, configured to judge whether a connection of the target to be intercepted has already been established or not after the first acquiring unit acquires the target to be intercepted and the intercepting interface address, and send to the configuring unit a judging result that no connection has been established, send to a modifying unit a judging result that the connection has been established;

the modifying unit is configured to modify the data path configuration information configured by the configuring unit when receiving the judging result that the connection has been established sent by the judging unit; and send the modified data path configuration information to the first sending unit;

the configuring unit is further configured to configure the data path configuration information on the user plane entity GW-U according to the target to be intercepted and the intercepting interface address acquired by the first acquiring unit when receiving the judging result that no connection has been established sent by the judging unit;

the first sending unit is further configured to send the modified data path configuration information to the GW-U when receiving the modified data path configuration information sent by the modifying unit, so that the GW-U modifies the path for data transmission which has already been established.

Optionally, the apparatus further includes:

an allocating unit, configured to allocate a connection identifier of the intercepting interface for the intercepting connection established by the establishing unit;

a second sending unit, configured to send the connection identifier to the user plane entity GW-U.

Optionally, the apparatus further includes:

a second acquiring unit, configured to acquire the encryption information which is configured to encrypt the data of the target to be intercepted after the first acquiring unit acquires the target to be intercepted and the intercepting interface address;

a third sending unit, configured to send the encryption information to the GW-U.

A fourth aspect provides an apparatus for intercepting user data, including:

a first receiving unit, configured to receive data path configuration information sent by a control plane entity GW-C, the data path configuration information includes: a target to be intercepted and an intercepting interface address;

an establishing unit, configured to establish a path for data transmission according to the data path configuration information;

an intercepting unit, configured to intercept data transmitted by the target to be intercepted on the path;

a first sending unit, configured to send the data to an intercepting entity through the intercepting interface address.

Optionally, the first receiving unit includes:

a first information receiving unit, configured to receive the data path configuration information sent by the GW-C through a message of configuring a data path; or, a second information receiving unit, configured to receive the target to be intercepted and the intercepting interface address in the data path configuration information sent by the GW-C through different messages.

Optionally, the apparatus further includes:

a second receiving unit, configured to receive modified data path configuration information sent by the GW-C after the first receiving unit receives the data path configuration information sent by the GW-C and if a connection of the target to be intercepted has already been established;

a modifying unit, configured to modify the path for data transmission which has already been established according to the modified data path configuration information.

Optionally, the apparatus further includes:

a third receiving unit, configured to receive a connection identifier of an intercepting interface, which is allocated for an intercepting connection with the intercepting entity, sent by the GW-C;

a second sending unit, configured to send the data intercepted by the intercepting unit to the intercepting entity according to the connection identifier.

Optionally, the apparatus further includes:

an allocating unit, configured to allocate a connection identifier of the intercepting interface for the intercepting connection established with the intercepting entity;

a third sending unit, configured to send the data intercepted by the intercepting unit 83 to the intercepting entity according to the connection identifier;

a fourth sending unit, configured to send the connection identifier to the GW-C.

Optionally, the apparatus further includes:

a fourth receiving unit, configured to receive encryption information of the intercepting interface sent by the GW-C;

an encrypting unit, configured to encrypt the intercepted data using the encryption information;

a fifth sending unit, configured to send the encrypted data to the intercepting entity through the intercepting interface address.

A fifth aspect provides a control plane entity, including:

a transceiver, configured to acquire a target to be intercepted and an intercepting interface address;

a processor, configured to configure data path configuration information on a user plane entity GW-U according to the target to be intercepted and the intercepting interface address acquired by the transceiver; and initiate an establishment of an intercepting connection of an intercepting interface to an intercepting entity based on the intercepting interface address so as to transmit data of the target to be intercepted;

the transceiver is further configured to send the data path configuration information configured by the processor to the user plane entity GW-U so that the GW-U establishes a path for data transmission.

Optionally, the transceiver acquiring the target to be intercepted and the intercepting interface address specifically includes:

the transceiver receives a request of configuring the target to be intercepted sent by the intercepting entity, the request of configuring the target to be intercepted includes the target to be intercepted and the intercepting interface address; or receives a request of configuring the target to be intercepted sent by the intercepting entity, the request of configuring the target to be intercepted includes the target to be intercepted and an identifier of the intercepting entity; converts the identifier of the intercepting entity, obtains a converted identifier, and uses the converted identifier as the intercepting interface address.

Optionally, the transceiver sending the data path configuration information configured by the processor to the user plane entity GW-U specifically includes:

sends the data path configuration information to the user plane entity GW-U through a message of configuring a data path; or, sends the target to be intercepted and the intercepting interface address in the data path configuration information to the user plane entity GW-U through different messages.

Optionally, the processor is further configured to judge whether a connection of the target to be intercepted has already been established or not after the transceiver acquires the target to be intercepted and the intercepting interface address, if not, send to the transceiver a judging result that no connection has been established; if yes, modify the data path configuration information, and send the modified data path configuration information to the transceiver;

the transceiver is further configured to send the data path configuration information to the user plane entity GW-U after receiving the result that no connection has been established; or, send the modified data path configuration information to the GW-U when receiving the modified data path configuration information, so that the GW-U modifies the path for data transmission which has already been established.

Optionally, the processor is further configured to allocate a connection identifier of the intercepting interface for the intercepting connection;

the transceiver is further configured to send the connection identifier allocated by the processor to the user plane entity GW-U.

Optionally, the transceiver is further configured to acquire encryption information of the intercepting connection after acquiring the target to be intercepted and the intercepting interface address, the encryption information is configured to encrypt the data of the target to be intercepted; and send the encryption information to the GW-U.

A sixth aspect provides a user plane entity, including:

a transceiver, configured to receive data path configuration information sent by a control plane entity GW-C, the data path configuration information includes: a target to be intercepted and an intercepting interface address;

a processor, configured to establish a path for data transmission according to the data path configuration information received by the transceiver; and intercept data transmitted by the target to be intercepted on the path;

the transceiver is further configured to send the data intercepted by the processor to an intercepting entity through the intercepting interface address.

Optionally, the transceiver receiving the data path configuration information sent by the GW-C specifically includes: receives the data path configuration information sent by the GW-C through a message of configuring a data path; or, receives the target to be intercepted and the intercepting interface address in the data path configuration information sent by the GW-C through different messages.

Optionally, the transceiver is further configured to receive modified data path configuration information sent by the GW-C after receiving the data path configuration information sent by the GW-C and if the connection of the target to be intercepted has already been established;

the processor modifies the path for data transmission which has already been established according to the modified data path configuration information received by the transceiver.

Optionally, the transceiver is further configured to receive a connection identifier of the intercepting interface, which is allocated for the intercepting connection, sent by the GW-C; and send the data to the intercepting entity according to the connection identifier.

Optionally, the processor is further configured to allocate a connection identifier of the intercepting interface for the intercepting connection;

the transceiver is further configured to send the connection identifier allocated by the processor to the GW-C.

Optionally, the transceiver is further configured to receive encryption information sent by the GW-C;

the processor is further configured to encrypt the intercepted data using the encryption information received by the transceiver;

the transceiver is further configured to send the data encrypted by the processor to an intercepting entity through the intercepting connection.

A seventh aspect provides a system for intercepting user data, including: a control plane entity and a user plane entity, the control plane entity includes: an X1/X2 interface unit, a conversation managing unit and a data path configuring unit, the user plane entity includes an X3 interface unit, a data path managing unit and a packet data forwarding unit, wherein, the X1/X2 interface unit is configured to acquire trigger event information of a target to be intercepted, and send the trigger event information to the conversation managing unit; and receive event information of the target to be intercepted sent by the conversation managing unit; and initiate an establishment of an intercepting connection of the X3 interface to an intercepting entity based on the X3 interface unit so as to transmit the data of the target to be intercepted to the intercepting entity; wherein, the trigger event information includes: the target to be intercepted and an X3 interface address;

the conversation managing unit is configured to send the trigger event information to the data path configuring unit after receiving the trigger event information sent by the X1/X2 interface unit;

the data path configuring unit is configured to configure data path configuration information on the GW-U after receiving the trigger event information, and send the data path configuration information to the data path managing unit;

the data path managing unit is configured to configure and establish a path for data transmission after receiving the data path configuration information, and intercept the data transmitted by the target to be intercepted on the path, and forward the data to the packet data forwarding unit;

the data packet forwarding unit is configured to send the data to the X3 interface unit;

the X3 interface unit is configured to send the received data to the intercepting entity.

It should be understood from the above technical solutions that, in the embodiments of the present invention, in an architecture in which the control plane entity and the user plane entity are separated, the user plane entity supports the function of intercepting interface (such as X3 interface), so as to report the data flow of the user to the intercepting entity (such as LEA or LIC) through the intercepting interface, which significantly decreases data flow of the target to be intercepted between the control plane entity and the user plane entity as well as avoiding the structure complication of the control plane entity, improves performance of the GW-C and reduces cost. Furthermore, when acquiring the target to be intercepted, it is judged whether the connection of the target to be intercepted has already been established or not, so as to determine whether to directly configure the data path configuration information of the target to be intercepted, or modify the data path configuration information which has already been configured, which significantly decreases the data forwarding flow between the GW-C and the GW-U, simplifies complexity of the GW-C, improves performance of the GW-C and reduces cost.

BRIEF DESCRIPTION OF DRAWINGS

To illustrate the technical solutions of embodiments of the present invention or the conventional art more clearly, the accompanying drawings used in description of the embodiments or the conventional art will be illustrated briefly as follows. Apparently, the accompanying drawings only show certain embodiments of the present invention, persons skilled in the art can derive other drawings from them without creative work.

DESCRIPTION OF EMBODIMENTS

The technical solutions in embodiments of the present invention will be clearly and completely described below by reference to accompanying drawings in the embodiments of the present invention. Obviously, the embodiments described are only part of the embodiments provided by the present invention, but not all of them. Based on the embodiments of the present invention, all of other embodiments obtained by those skilled in the art without creative work are within the protection scope of the present invention.

In the embodiments of the present invention, the function of signaling processing and the function of user plane data forwarding of the gateway are separated, and the function of signaling processing of the interface is provided on a general computer platform, so as to form a gateway controlling node. The function of user plane data forwarding is provided on a specialized router platform, so as to form a gateway forwarding node. That is, the gateway controlling node and the gateway forwarding node are separated, which can significantly simplify design of a hardware platform and reduce cost of the hardware platform, and thus can accelerate deployment of the mobile packet data network.

Wherein, in the structure wherein the control plane of the gateway and the user plane thereof are separated, the control plane entity (GW-C) of the gateway can be called as a control plane gateway, and can also be called as a gateway controller. The user plane entity (GW-U) of the gateway can be called as a user plane gateway, and can also be called as a packet data forwarding gateway, a forwarding node or a switching node. Wherein, concerning that both the control plane entity of the gateway and the mobility management entity (MME/SGSN) adopt a general computer platform, therefore, they can be arranged together.

Wherein, the structure wherein the control plane and the user plane are separated can be referred to the patent application document Application No.: PCT/CN2012/077960, in the title of: GATEWAY SYSTEM, DEVICE AND COMMUNICATION METHOD, filed on Jun. 29, 2012.

Figure 1:
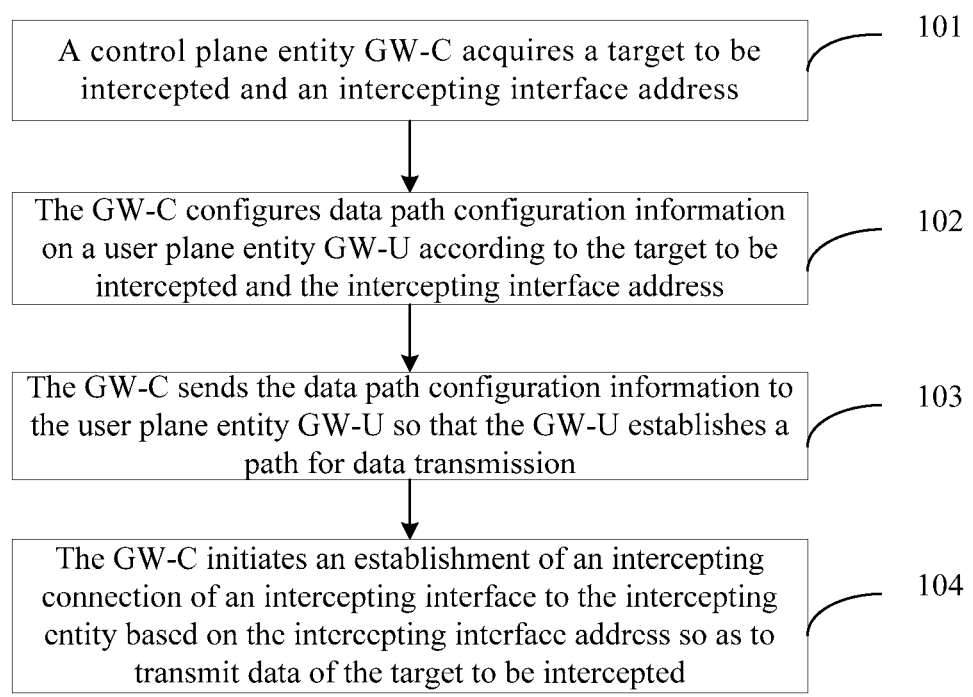
FIG. 1 is a first flow diagram of a method for configuring a path for intercepting user data provided by an embodiment of the present invention.

Please refer to FIG. 1, FIG. 1 is a first flow diagram of a method for configuring a path for intercepting user data provided by an embodiment of the present invention; the method includes:

Step 101: a control plane entity GW-C acquires a target to be intercepted and an intercepting interface address;

In the present embodiment, two acquiring modes are taken as examples, which specifically are:

One mode is: the GW-C receives a request of configuring a target to be intercepted sent by an intercepting plane entity, the request of configuring the target to be intercepted includes: the target to be intercepted and the intercepting interface address; wherein, the intercepting plane entity includes: a lawful interception center (LIC) or a law enforcement agency (LEA), but it is not limited to this, which can also include other legal intercepting devices.

Wherein, the target to be intercepted includes identification information and a reporting mode, etc., of the target to be intercepted, the intercepting interface address can be an address of an X3 interface, or can be an address of other interface which has the function of the X3 interface, which will not be limited in the present embodiment.

The other mode is: the GW-C receives a request of configuring a target to be intercepted sent by an intercepting entity, the request of configuring the target to be intercepted includes: the target to be intercepted and an identifier of the intercepting entity; then, the GW-C converts the identifier of the intercepting entity, obtains a converted identifier, and uses the converted identifier as the intercepting interface address.

That is to say, if the intercepting interface address is not included in the request of configuring the target to be intercepted received by the GW-C, it needs to convert the identifier of the intercepting entity into the intercepting interface address, and the converting procedure is: the GW-C acquires the intercepting interface address according to the identifier of the intercepting entity and configuration information of the intercepting entity. The identifier of the intercepting entity can be one of the following identifiers: an address of an X1 interface of the intercepting entity, an address of an X2 interface of the intercepting entity, a name of the intercepting entity and a domain name of the intercepting entity, etc. The configuration information of the intercepting entity at least includes the identifier of the intercepting entity and an identifier of the corresponding intercepting interface address. The GW-C can further match the identifier of the intercepting entity in the request of configuring the target to be intercepted with the identifier of the intercepting entity in the configuration information of the intercepting entity, and acquire the corresponding intercepting interface address.

If there is only one intercepting entity existed in the network, the identifier of the intercepting entity or the intercepting interface address may not be carried in the request of configuring the target by the intercepting entity. The GW-C acquires the intercepting interface address directly from the configuration information of the intercepting entity.

Step 102: the GW-C configures data path configuration information on a user plane entity GW-U according to the target to be intercepted and the intercepting interface address;

wherein, the configured data path configuration information can include: opposite end network element information, path identifier information of the opposite end network element and relevant information of the data path (such as the IP address of an UE) etc., but is not limited to these, which can also include other parameters according to specific situations.

The configuration procedure is a common technology for those skilled in the art, which will not be described here.

Step 103: the GW-C sends the data path configuration information to the user plane entity GW-U so that the GW-U establishes a path for data transmission;

In the present embodiment, the data path configuration information can be sent to the user plane entity GW-U through a message of configuring a data path; obviously, the target to be intercepted and the intercepting interface address in the data path configuration information can also be sent to the user plane entity GW-U through different messages, for example, the GW-C sends the target to be intercepted in the data path configuration information to the GW-U through the message of configuring the data path, and sends the intercepting interface address in the data path configuration information to the GW-U through another message, which will not be limited in the present embodiment.

Step 104: the GW-C initiates an establishment of an intercepting connection of an intercepting interface to the intercepting entity based on the intercepting interface address so as to transmit data of the target to be intercepted.

That is to say, the GW-C initiates an establishment of the intercepting connection of the intercepting interface to the intercepting entity through the intercepting interface address so as to subsequently transmit data of the target to be intercepted.

Wherein, in the present embodiment, when in an actual implementation, there is no sequence between the step 103 and the step 104, they can be executed simultaneously, which will not be limited in the present embodiment.

Alternatively, the step 104 can also be executed between the step 101 and the step 102.

In the embodiment of the present invention, in an architecture in which the control plane entity (i.e. the control node) and the user plane entity (forward node) are separated, through supporting, by the user plane entity, the function of the intercepting interface (such as X3 interface), the data flow of the user is reported to the intercepting entity (such as LEA or LIC) through the intercepting interface, which significantly decreases the data flow of the target to be intercepted between the control plane entity and the user plane entity as well as avoiding structure complication of the control plane entity, improves performance of the GW-C and reduces cost.

Figure 2:
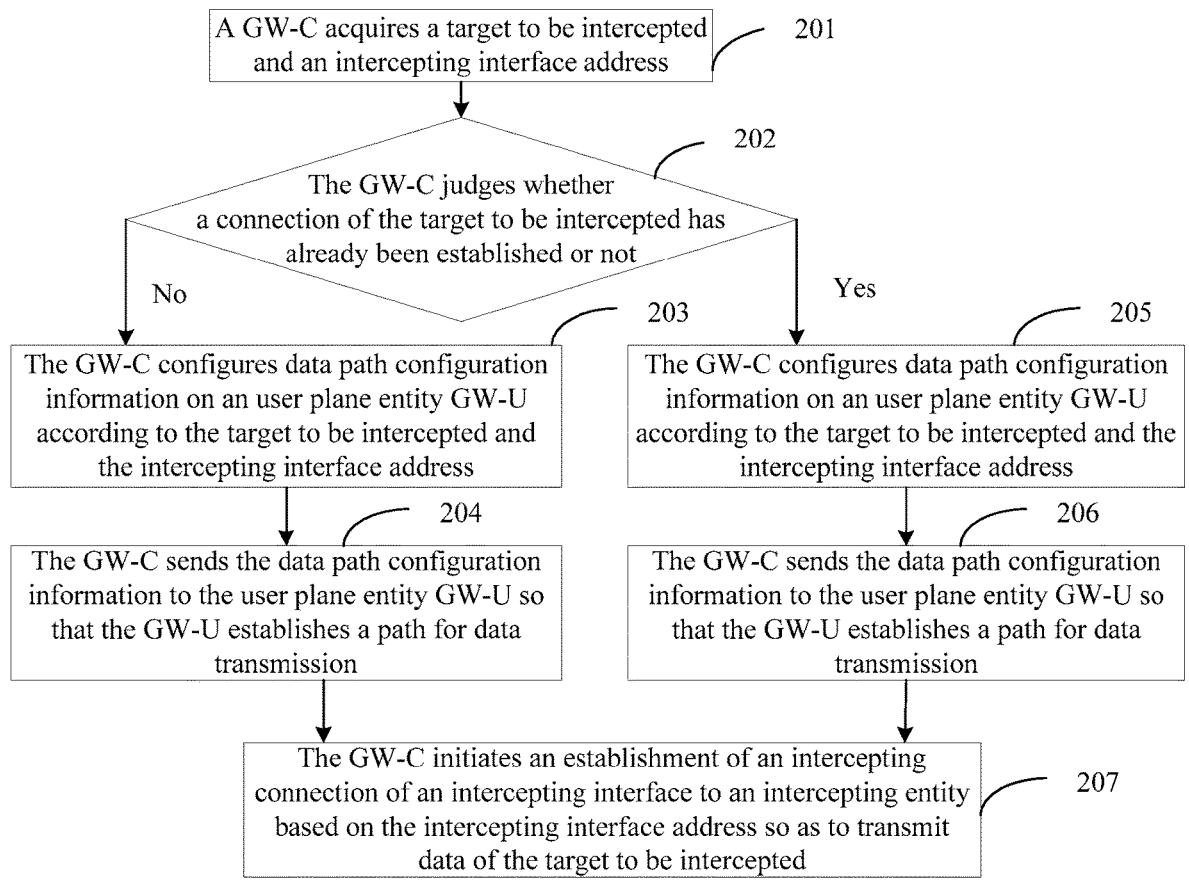
FIG. 2 is a second flow diagram of the method for configuring a path for intercepting user data provided by an embodiment of the present invention.

Please refer to FIG. 2, which is a second flow diagram of the method for configuring a path for intercepting user data provided by an embodiment of the present invention, the method includes:

Step 201: a GW-C acquires a target to be intercepted and an intercepting interface address;

Wherein, there are two acquiring modes, and the detailed acquiring procedure thereof has been illustrated above and will not be described here.

Step 202: the GW-C judges whether a connection of the target to be intercepted has already been established or not, if not, execute step 203, step 204 and step 207; if yes, execute step 205, step 206 and step 207;

Step 203: the GW-C configures data path configuration information on a user plane entity GW-U according to the target to be intercepted and the intercepting interface address;

Step 204: the GW-C sends the data path configuration information to the user plane entity GW-U so that the GW-U establishes a path for data transmission;

Wherein, there are two sending modes of the data path configuration information, and the detailed procedure thereof has been illustrated above and will not be described here.

Step 205: the GW-C modifies the data path configuration information;

wherein, the data path configuration information includes an identifier of the target to be intercepted.

Step 206: the GW-C sends the modified data path configuration information to the GW-U so that the GW-U modifies the path for data transmission which is already established;

wherein, there are two sending modes of the modified data path configuration information:

one mode is: to send the modified data path configuration information to the user plane entity GW-U through a message of configuring a data path;

the other mode is: to send the target to be intercepted and the intercepting interface address in the modified data path configuration information to the user plane entity GW-U through different messages.

Step 207: the GW-C initiates an establishment of an intercepting connection of an intercepting interface to an intercepting entity based on the intercepting interface address so as to transmit data of the target to be intercepted.

In an embodiment of the present invention, when in an actual implementation, there is no sequence between the step 204 and step 207, they can be executed simultaneously, which is not limited in the present embodiment.

Similarly, when in an actual implementation, there is no sequence between the step 206 and step 207, they can be executed simultaneously, which is not limited in the present embodiment.

In an embodiment of the present invention, when acquiring the target to be intercepted, it is judged whether the connection of the target to be intercepted has already been established, so as to determine whether to directly configure the data path configuration information of the target to be intercepted, or modify the data path configuration information which has already been configured, which significantly decreases the data forwarding flow between the GW-C and the GW-U, simplifies complexity of the GW-C, improves performance of the GW-C and reduces cost.

Optionally, in all the embodiments above, the method can further include: allocating a connection identifier of the intercepting interface for the intercepting connection; and sending the connection identifier to the user plane entity GW-U.

Optionally, in all the embodiments above, the method can further include: after acquiring the target to be intercepted and the intercepting interface address, acquiring encryption information of the intercepting connection, the encryption information is configured to encrypt the data of the target to be intercepted; and sending the encryption information to the GW-U.

Figure 3:
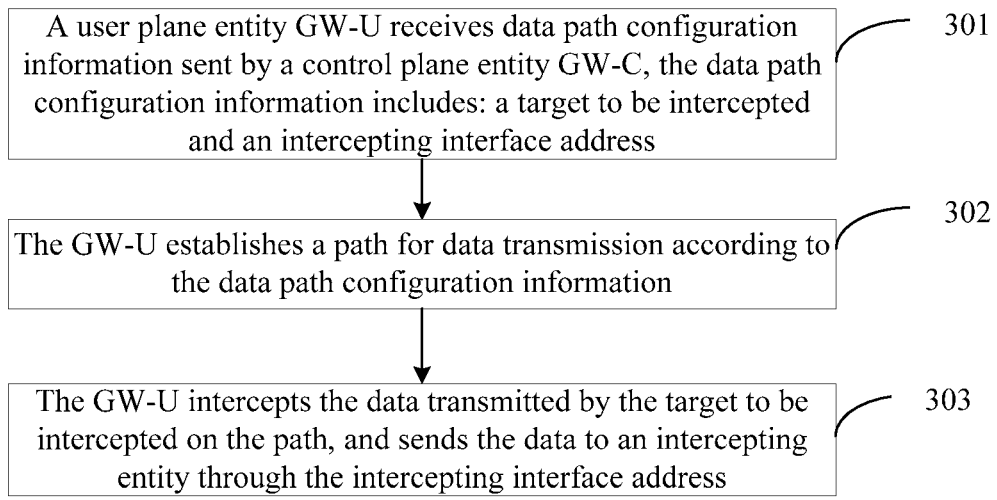
FIG. 3 is a first flow diagram of a method for intercepting user data provided by an embodiment of the present invention.

Please refer to FIG. 3, which is a first flow diagram of a method for intercepting user data provided by an embodiment of the present invention; the method includes:

Step 301: a user plane entity GW-U receives data path configuration information sent by a control plane entity GW-C, the data path configuration information includes: a target to be intercepted and an intercepting interface address;

Wherein, there are two receiving modes of the data path configuration information sent by the GW-C, which specifically are:

One mode is: receiving the data path configuration information sent by the GW-C through a message of configuring a data path; the data path configuration information includes: the target to be intercepted and the intercepting interface address;

The other mode is: receiving the target to be intercepted and the intercepting interface address in the data path configuration information sent by the GW-C respectively through different messages. For example, firstly, the target to be intercepted is sent through the message of configuring the data path, then the intercepting interface address is sent through another message, such as a signaling message, which will not be limited in the present embodiment; of course, the target to be intercepted and the intercepting interface address can also be sent simultaneously through different messages, which will not be limited in the present embodiment.

Step 302: the GW-U establishes a path for data transmission according to the data path configuration information;

wherein, the data path configuration information includes: opposite end network element information, data path identifier information of the opposite end and relevant information of the data path (such as the IP address of an UE) etc.

Step 303: the GW-U intercepts the data transmitted by the target to be intercepted on the path, and sends the data to an intercepting entity through the intercepting interface address.

Wherein, the GW-U can recognize which one is a data packet of the target to be intercepted according to an IP address of the data packet, copy this data packet and report the data packet to the intercepting entity (such LEA or LIC etc.) through a corresponding X3 connection.

In an embodiment of the present invention, in an architecture in which the GW-C and the GW-U are separated, the user plane entity reports the intercepted data flow of the user to the intercepting entity (such as LEA or LIC) through the intercepting interface (such X3 interface), which significantly decreases the data flow of the target to be intercepted between the control plane entity and the user plane entity as well as simplifying structure complexity of the control plane entity, improves performance of the GW-C and reduces cost.

Optionally, in the above embodiment, if a connection of the target to be intercepted has already been established after the GW-U receives the data path configuration information sent by the GW-C, the method can further include: the GW-U receives a modified data path configuration information sent by the GW-C; and modifies the path for data transmission, which has already been established, according to the modified data path configuration information.

Optionally, in the above embodiment, the method can further include: the GW-U receives a connection identifier of the intercepting interface, which is allocated for an intercepting connection, sent by the GW-C; and sends the data to the intercepting entity according to the connection identifier.

Optionally, in the above embodiment, the method can further include: the GW-U allocates a connection identifier of the intercepting interface for the intercepting connection; and sends the connection identifier to the GW-C.

In the present embodiment, if the GW-U does not receive the connection identifier of the intercepting connection sent by the GW-C, then the GW-U allocates a connection identifier for the intercepting connection.

Optionally, the method can further include: the GW-U receives encryption information of the intercepting connection sent by the GW-C; and encrypts the intercepted data using the encryption information; and sends the encrypted data to the intercepting entity through the intercepting connection.

Figure 4:
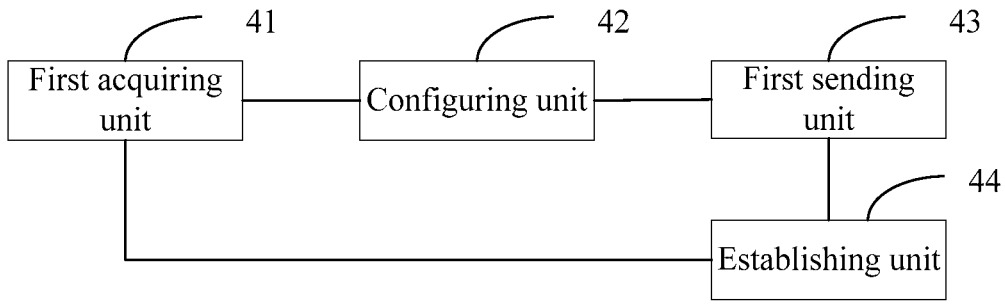
FIG. 4 is a first schematic structural diagram of an apparatus for configuring a path for intercepting user data provided by an embodiment of the present invention.

Based on the implementing procedure of the above method, an embodiment of the present invention further provides an apparatus for configuring a path for intercepting user data, of which the structure is as shown in FIG. 4. The apparatus includes: a first acquiring unit 41, a configuring unit 42, a first sending unit 43 and an establishing unit 44, wherein, the first acquiring unit 41 is configured to acquire a target to be intercepted and an intercepting interface address; the configuring unit 42 is configured to configure data path configuration information on a user plane entity GW-U according to the target to be intercepted and the intercepting interface address; the first sending unit 43 is configured to send the data path configuration information to the user plane entity GW-U so that the GW-U establishes a path for data transmission; and the establishing unit 44 is configured to initiate an establishment of an intercepting connection of an intercepting interface to an intercepting entity based on the intercepting interface address so as to transmit data of the target to be intercepted.

Wherein, there is no sequence between execution of the first sending unit 43 and execution of the establishing unit 44, and they can be executed simultaneously, which is not limited in the present embodiment.

Alternatively, the establishing unit 44 can establish the intercepting connection before execution of the configuring unit 42, and can also establish the intercepting connection after the first sending unit 43 sends the data path configuration information and before the intercepted data are transmitted, and the figure takes an example of establishing the intercepting connection after the first sending unit, but it is not limited to this.

Optionally, the first acquiring unit can include: a first receiving unit; and/or, the first acquiring unit can further include a second receiving unit and a converting unit, wherein, the first receiving unit is configured to receive a request of configuring the target to be intercepted sent by the intercepting entity, the request of configuring the target to be intercepted includes the target to be intercepted and the intercepting interface address; the second receiving unit is configured to receive a request of configuring the target to be intercepted sent by the intercepting entity, the request of configuring the target to be intercepted includes the target to be intercepted and an identifier of the intercepting entity; the converting unit is configured to convert the identifier of the intercepting entity, obtain a converted identifier, and use the converted identifier as the intercepting interface address.

Optionally, the first sending unit includes: a first information sending unit and/or a second information sending unit, wherein, the first information sending unit is configured to send the data path configuration information to the user plane entity GW-U through a message of configuring a data path; the second information sending unit is configured to send the target to be intercepted and the intercepting interface address in the data path configuration information to the user plane entity GW-U through different messages.

Figure 5:
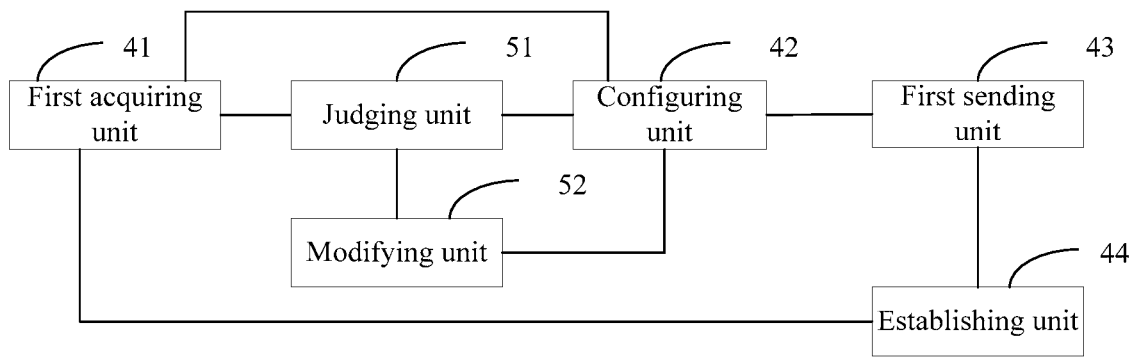
FIG. 5 is a second schematic structural diagram of the apparatus for configuring the path for intercepting user data provided by an embodiment of the present invention.

Optionally, the apparatus can further include: a judging unit 51 and a modifying unit 52, of which the structure is as shown in FIG. 5, FIG. 5 is a second schematic structural diagram of the apparatus for configuring a path for intercepting user data provided by an embodiment of the present invention, wherein, the judging unit 51 is configured to judge whether a connection of the target to be intercepted has already been established or not after the first acquiring unit 41 acquires the target to be intercepted and the intercepting interface address, and send, to the configuring unit 42, a judging result that no connection has been established, and send, to the modifying unit 52, a judging result that the connection has been established; wherein, the modifying unit 52 is configured to modify the data path configuration information configured by the configuring unit 42 when receiving the judging result that the connection has been established sent by the judging unit 51; and send the modified data path configuration information to the first sending unit 43; the configuring unit 42 is further configured to configure the data path configuration information on the user plane entity GW-U according to the target to be intercepted and the intercepting interface address acquired by the first acquiring unit 41 when receiving the judging result that no connection has been established sent by the judging unit 51; the first sending unit is further configured to send the modified data path configuration information to the GW-U when receiving the modified data path configuration information sent by the modifying unit 52, so that the GW-U modifies the path for data transmission which has already been established.

Figure 6:
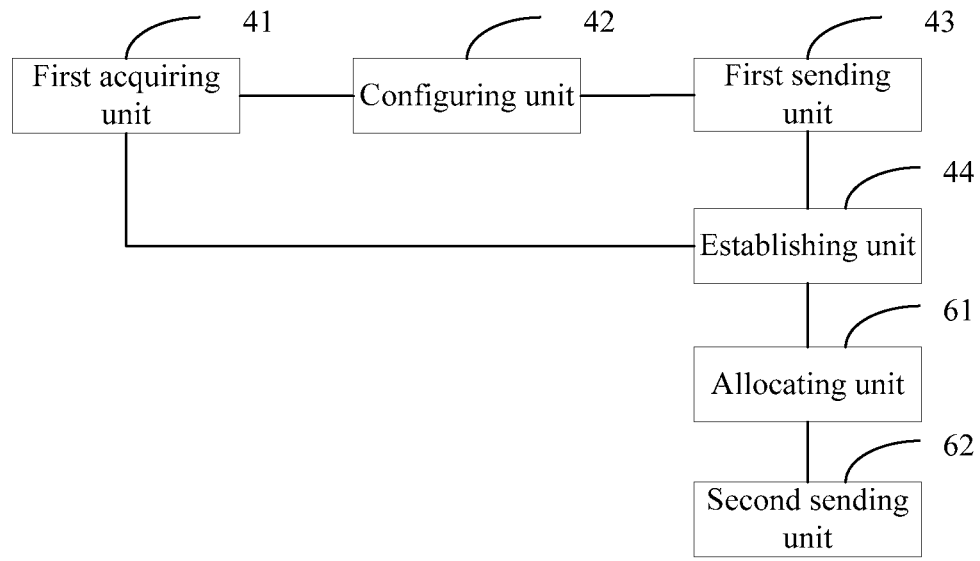
FIG. 6 is a third schematic structural diagram of the apparatus for configuring the path for intercepting user data provided by an embodiment of the present invention.

Optionally, the apparatus can further include: an allocating unit 61 and a second sending unit 62, of which the structure is as shown in FIG. 6, FIG. 6 is a third schematic structural diagram of the apparatus for configuring the path for intercepting user data provided by an embodiment of the present invention, wherein, the allocating unit 61 is configured to allocate a connection identifier of the intercepting interface for the intercepting connection established by the establishing unit 44; the second sending unit 62 is configured to send the connection identifier allocated by the allocating unit 61 to the user plane entity GW-U.

Figure 7:
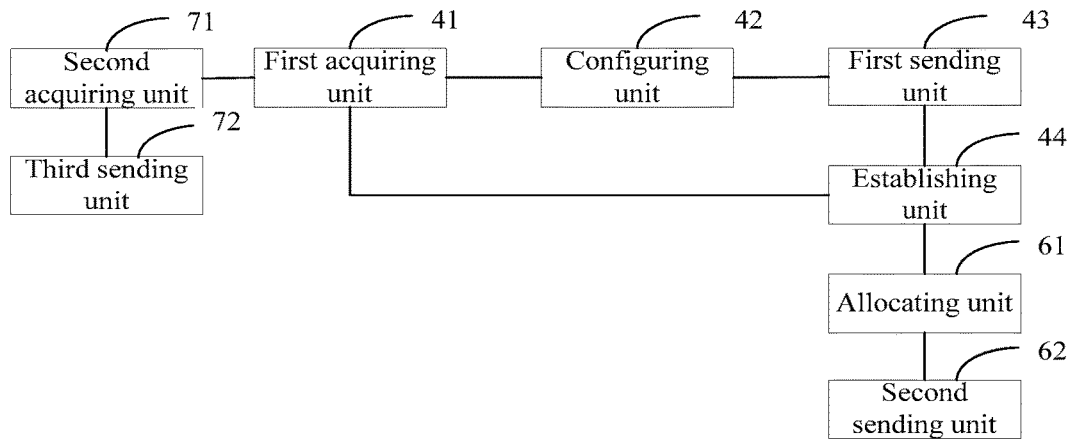
FIG. 7 is a fourth schematic structural diagram of the apparatus for configuring the path for intercepting user data provided by an embodiment of the present invention.

Optionally, the apparatus can further include: a second acquiring unit 71 and a third sending unit 72, of which the structure is as shown in FIG. 7, FIG. 7 is a fourth schematic structural diagram of the apparatus for configuring the path for intercepting user data provided by an embodiment of the present invention, wherein, the second acquiring unit 71 is configured to acquire encryption information which is configured to encrypt the data of the target to be intercepted after the first acquiring unit 41 acquires the target to be intercepted and the intercepting interface address; the third sending unit 72 is configured to send the encryption information acquired by the second acquiring unit 71 to the GW-U.

Optionally, the apparatus for configuring the path for intercepting user data can be integrated in the GW-C, or can be deployed independently, which is not limited in the present embodiment.

The implementation procedure of function and effect of each unit in the apparatus can be referred to the implementation procedure in corresponding steps of the method above in detail, which will not be described here.

Figure 8:
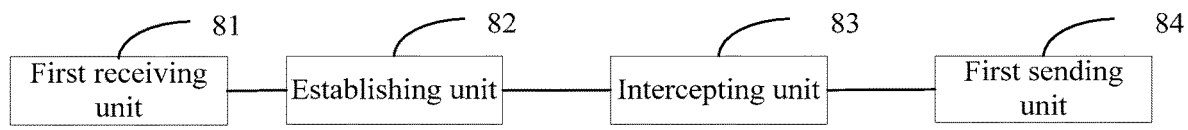
FIG. 8 is a first schematic structural diagram of an apparatus for intercepting user data provided by an embodiment of the present invention.

Please refer to FIG. 8, which is a schematic structural diagram of an apparatus for intercepting user data provided by an embodiment of the present invention, the apparatus includes: a first receiving unit 81, an establishing unit 82, an intercepting unit 83 and a first sending unit 84, wherein, the first receiving unit 81 is configured to receive data path configuration information sent by a control plane entity GW-C, the data path configuration information includes: a target to be intercepted and an intercepting interface address; the establishing unit 82 is configured to establish a path for data transmission according to the data path configuration information; the intercepting unit 83 is configured to intercept data transmitted by the target to be intercepted on the path; the first sending unit 84 is configured to send the data to an intercepting entity through the intercepting interface address.

Optionally, the first receiving unit includes: a first information receiving unit and/or a second information receiving unit, wherein, the first information receiving unit is configured to receive the data path configuration information sent by the GW-C through a message of configuring a data path; the second information receiving unit is configured to receive the target to be intercepted and the intercepting interface address in the data path configuration information sent by the GW-C through different messages.

Figure 9:
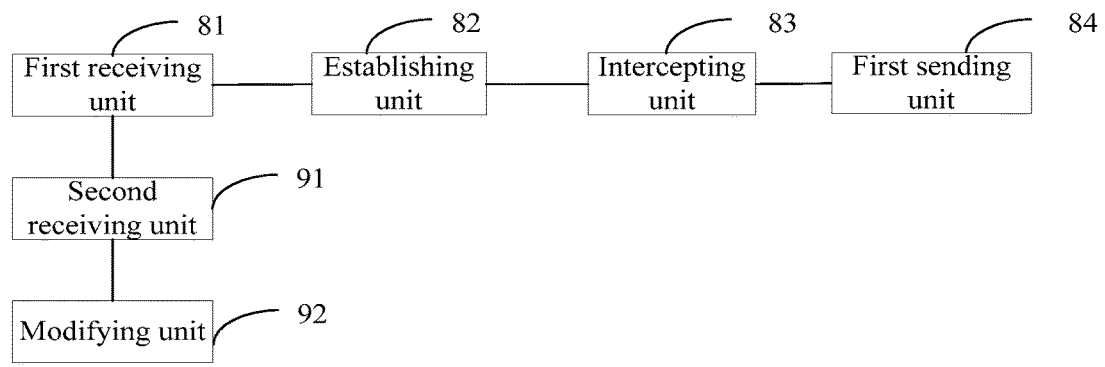
FIG. 9 is a second schematic structural diagram of the apparatus for intercepting user data provided by an embodiment of the present invention.

Optionally, the apparatus can further include: a second receiving unit 91 and a modifying unit 92, the structure of which is as shown in FIG. 9, FIG. 9 is a second schematic structural diagram of the apparatus for intercepting user data provided by an embodiment of the present invention, wherein, the second receiving unit 91 is configured to receive modified data path configuration information sent by the GW-C after the first receiving unit 81 receives the data path configuration information sent by the GW-C and if a connection of the target to be intercepted has already been established; the modifying unit 92 is configured to modify the path for data transmission which has already been established according to the modified data path configuration information.

Figure 10:
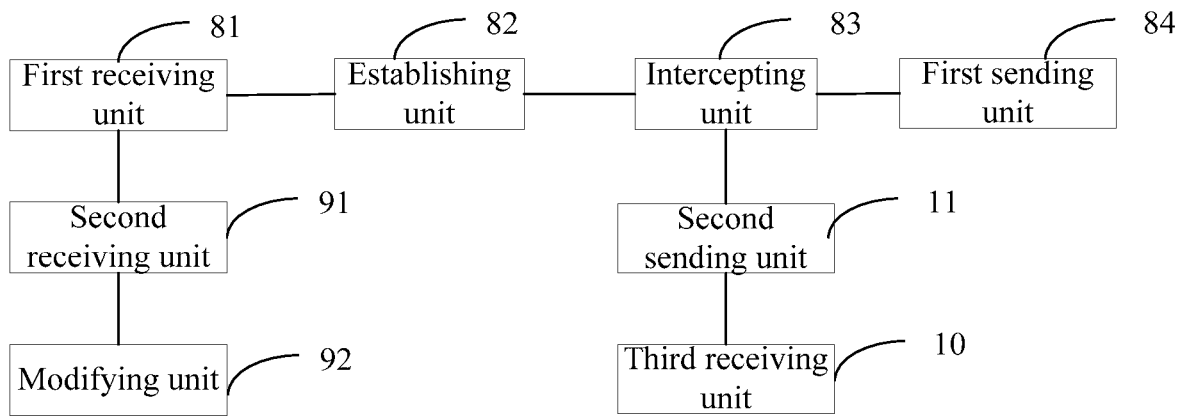
FIG. 10 is a third schematic structural diagram of the apparatus for intercepting user data provided by an embodiment of the present invention.

Optionally, the apparatus can further include: a third receiving unit 10 and a second sending unit 11, of which the structure is as shown in FIG. 10, FIG. 10 is a third schematic structural diagram of the apparatus for intercepting user data provided by an embodiment of the present invention, wherein, the third receiving unit 10 is configured to receive a connection identifier of an intercepting interface, which is allocated for an intercepting connection with the intercepting entity, sent by the GW-C; the second sending unit is configured to send the data intercepted by the intercepting unit 83 to the intercepting entity according to the connection identifier.

Figure 11:
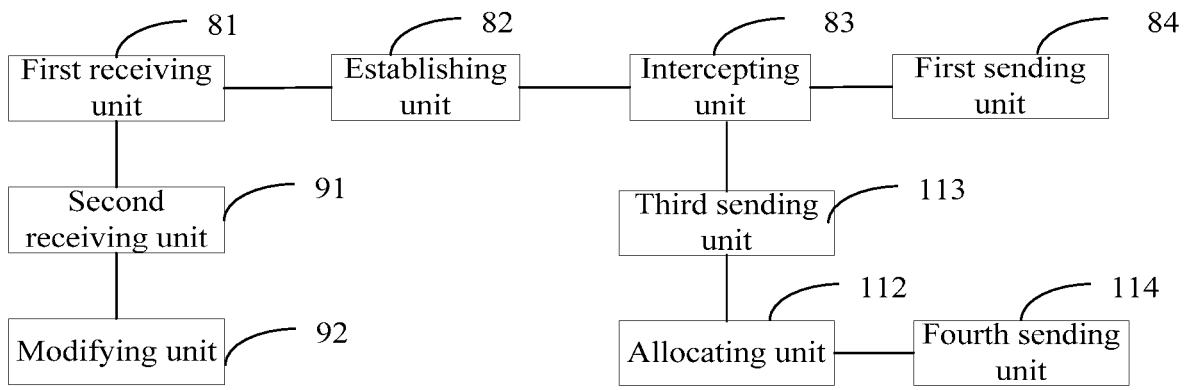
FIG. 11 is a fourth schematic structural diagram of the apparatus for intercepting user data provided by an embodiment of the present invention.

Optionally, the apparatus can further include: an allocating unit 112, a third sending unit 113 and a fourth sending unit 114, the structure of which is as shown in FIG. 11, FIG. 11 is a fourth schematic structural diagram of the apparatus for intercepting user data provided by an embodiment of the present invention, wherein, the allocating unit 112 is configured to allocate a connection identifier of the intercepting interface for the intercepting connection established with the intercepting entity; the third sending unit 113 is configured to send the data intercepted by the intercepting unit 83 to the intercepting entity according to the connection identifier; the fourth sending unit 114 is configured to send the connection identifier to the GW-C. Wherein, there is no sequence between execution of the third sending unit 113 and execution of the fourth unit 114, and they also can execute simultaneously, which is not limited in the present embodiment.

Figure 12:
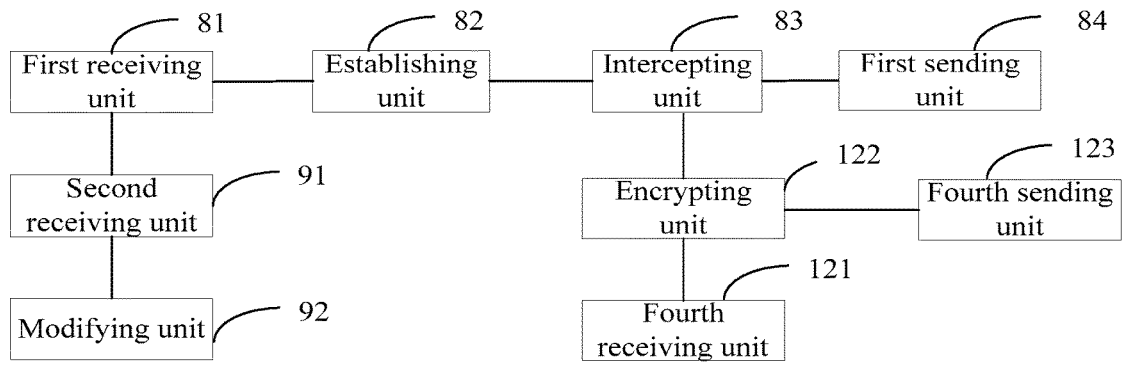
FIG. 12 is a fifth schematic structural diagram of the apparatus for intercepting user data provided by an embodiment of the present invention.

Optionally, the apparatus can further include: a fourth receiving unit 121, an encrypting unit 122 and a fifth sending unit 123, the structure of which is as shown in FIG. 12, FIG. 12 is a fifth schematic structural diagram of the apparatus for intercepting user data provided by an embodiment of the present invention, wherein, the fourth receiving unit 121 is configured to receive encryption information of the intercepting interface sent by the GW-C; the encrypting unit 122 is configured to encrypt the data intercepted by the intercepting unit 83 using the encryption information; the fifth sending unit 123 is configured to send the encrypted data to the intercepting entity through the intercepting interface address.

Optionally, the apparatus for intercepting user data can be integrated in the GW-U, or can be deployed separately, which is not limited in the present embodiment.

The implementation procedure of function and effect of each unit in the apparatus can be referred to the implementation procedure in corresponding steps of the method above in detail, which will not be described here.

Correspondingly, an embodiment of the present invention further provides a control plane entity, the control plane entity includes: a transceiver and a processor, wherein, the transceiver is configured to acquire a target to be intercepted and an intercepting interface address; the processor is configured to configure data path configuration information on a user plane entity GW-U according to the target to be intercepted and the intercepting interface address acquired by the transceiver; and initiate an establishment of an intercepting connection of an intercepting interface to an intercepting entity based on the intercepting interface address so as to transmit data of the target to be intercepted; the transceiver is further configured to send the data path configuration information configured by the processor to the user plane entity GW-U so that the GW-U establishes a path for data transmission.

Optionally, the transceiver receives the target to be intercepted and the intercepting interface address specifically includes: receives a request of configuring the target to be intercepted sent by the intercepting entity, the request of configuring the target to be intercepted includes the target to be intercepted and the intercepting interface address; or receives a request of configuring the target to be intercepted sent by the intercepting entity, the request of configuring the target to be intercepted includes the target to be intercepted and an identifier of the intercepting entity; converts the identifier of the intercepting entity, obtains a converted identifier, and uses the converted identifier as the intercepting interface address.

Optionally, the transceiver sending the data path configuration information configured by the processor to the user plane entity GW-U specifically includes: sends the data path configuration information to the user plane entity GW-U through a message of configuring a data path; or, sends the target to be intercepted and the intercepting interface address in the data path configuration information to the user plane entity GW-U through different messages.

Optionally, the processor is further configured to judge whether a connection of the target to be intercepted has already been established or not after the transceiver acquires the target to be intercepted and the intercepting interface address, if not, send to the transceiver a judging result that no connection has been established; if yes, modify the data path configuration information, and send the modified data path configuration information to the transceiver;

the transceiver is further configured to send the data path configuration information to the user plane entity GW-U after receiving the result that no connection has been established; or, send the modified data path configuration information to the GW-U when receiving the modified data path configuration information, so that the GW-U modifies the path for data transmission which has already been established.

Optionally, the processor is further configured to allocate a connection identifier of the intercepting interface for the intercepting connection.

The transceiver is further configured to send the connection identifier allocated by the processor to the user plane entity GW-U.

Optionally, the transceiver is further configured to acquire encryption information of the intercepting connection after acquiring the target to be intercepted and the intercepting interface address, the encryption information is configured to encrypt the data of the target to be intercepted; and send the encryption information to the GW-U.

The implementation procedure of function and effect of the transceiver and the processor in the control plane entity can be referred to the implementation procedure in corresponding steps of the method above in detail, which will not be described here.

An embodiment of the present invention further provides a user plane entity, the user plane entity includes: a transceiver and a processor, wherein, the transceiver is configured to receive data path configuration information sent by a control plane entity GW-C, the data path configuration information includes: a target to be intercepted and an intercepting interface address; the processor is configured to establish a path for data transmission according to the data path configuration information received by the transceiver; and intercept data transmitted by the target to be intercepted on the path; the transceiver is further configured to send the data intercepted by the processor to an intercepting entity through the intercepting interface address.

Optionally, the transceiver receiving data path configuration information sent by the GW-C specifically includes: receives the data path configuration information sent by the GW-C through a message of configuring a data path; or, receives the target to be intercepted and the intercepting interface address in the data path configuration information sent by the GW-C through different messages.

Optionally, the transceiver is further configured to receive modified data path configuration information sent by the GW-C after receiving the data path configuration information sent by the GW-C and if the connection of the target to be intercepted has already been established;

the processor modifies the path for data transmission which has already been established according to the modified data path configuration information received by the transceiver.

Optionally, the transceiver is further configured to receive a connection identifier of the intercepting interface, which is allocated for the intercepting connection, sent by the GW-C; and send the data to the intercepting entity according to the connection identifier.

Optionally, the processor is further configured to allocate a connection identifier of the intercepting interface for the intercepting connection;

the transceiver is further configured to send the connection identifier allocated by the processor to the GW-C.

Optionally, the transceiver is further configured to receive encryption information sent by the GW-C;

the processor is further configured to encrypt the intercepted data using the encryption information received by the transceiver;

the transceiver is further configured to send the data encrypted by the processor to the intercepting entity through the intercepting connection.

The implementation procedure of function and effect of the transceiver and the processor in the control plane entity can be referred to the implementation procedure in corresponding steps of the method above in detail, which will not be described here.

Figure 13:
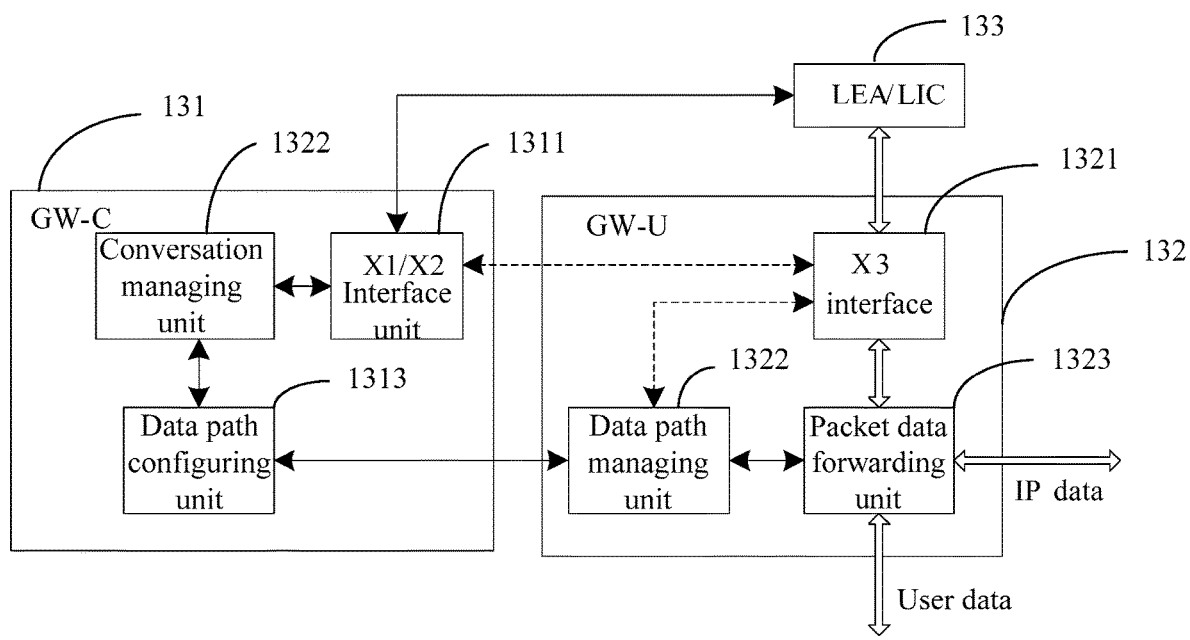
FIG. 13 is a schematic structural diagram of a system for intercepting user data provided by an embodiment of the present invention.

Correspondingly, an embodiment of the present invention further provides a system for intercepting user data, of which the schematic structural diagram is as shown in FIG. 13, which includes: a control plane entity GW-C 131, a user plane entity GW-U 132 and an intercepting entity (LEA or LIC) 133, the control plane entity 131 includes: an X1/X2 interface unit 1311, a conversation managing unit 1312 and a data path configuring unit 1313, the user plane entity includes an X3 interface unit 1321, a data path managing unit 1322 and a packet data forwarding unit 1323, wherein, the X1/X2 interface unit 1311 is configured to acquire trigger event information of a target to be intercepted, and send the trigger event information to the conversation managing unit; and receive event information of the target to be intercepted sent by the conversation managing unit;

and initiate an establishment of an intercepting connection of the X3 interface to the intercepting entity based on the X3 interface unit so as to transmit data of the target to be intercepted to the intercepting entity; wherein, the trigger event information includes: the target to be intercepted and an X3 interface address;

the conversation managing unit 1312 is configured to send the trigger event information to the data path configuring unit after receiving the trigger event information sent by the X1/X2 interface unit;

the data path configuring unit 1313 is configured to configure data path configuration information on the GW-U after receiving the trigger event information, and send the data path configuration information to the data path managing unit;

the data path managing unit 1322 is configured to configure and establish a path for data transmission after receiving the data path configuration information, and intercept the data transmitted by the target to be intercepted on the path, and forward the data to the packet data forwarding unit 1322;

the data packet forwarding unit 1323 is configured to send the data to the X3 interface unit 1321;

the X3 interface unit 1321 is configured to send the received data to the intercepting entity LEA or LIC 133.

The implementation procedure of function and effect of each unit in the system for intercepting user data can be referred to the implementation procedure in corresponding steps of the method above in detail, which will not be described here.

In order to facilitate comprehension of those skilled in the art, illustration is made based on the examples as follows.

Embodiment One

Figure 14:
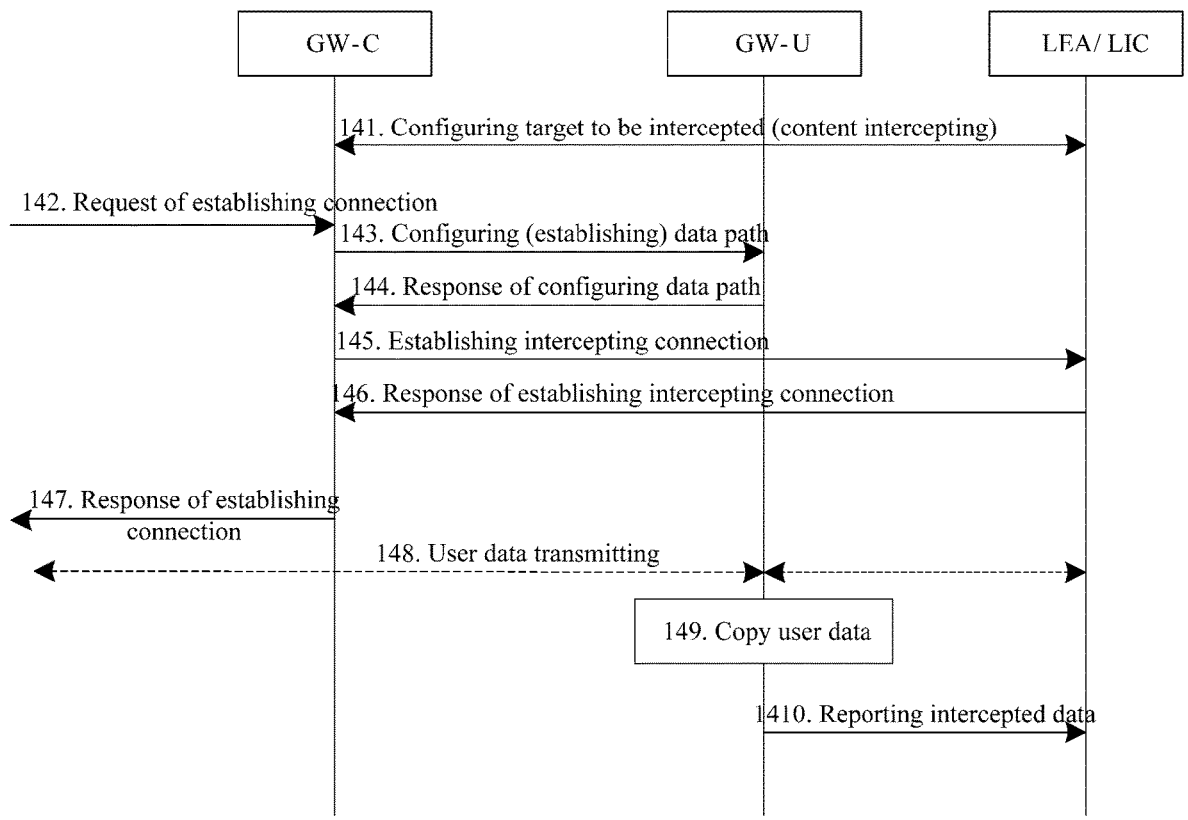
FIG. 14 is a flow diagram of a first application example provided by an embodiment of the present invention.

Please refer to FIG. 14, which is a flow diagram of a first application example provided by an embodiment of the present invention, and the present embodiment illustrates a procedure of configuring (establishing) a data path between a control plane entity GW-C and a user plane entity GW-U, which specifically includes:

step 141: the GW-C receives a request message of intercepting a target sent by a lawful interception center LIC or a lawful enforcement agency LEA;

wherein, the request message of intercepting the target includes: identifier information of the target to be intercepted, a reporting mode, and/or, an X3 interface address or a network element identifier of the LEA or LIC. Wherein, the reporting mode can include reporting communication contents etc. and the GW-C returns a response message of configuring parameters of the target to be intercepted to the LEA or LIC;

Step 142: the GW-C receives a request message of establishing a connection, for example, receives a request of establishing a conversation sent by an MME, or receives a request of establishing a PDP sent by an SGSN, then allocates an IP address for a user equipment UE;

Step 143: if the UE which establishes the connection is the target to be intercepted, then the GW-C issues a message of configuring a data path to the GW-U;

wherein, the message of configuring the data path includes: an intercepting identifier (such as an identifier of the UE); of course, the message of configuring the data path can also include configuration information of the X3 interface. Wherein, the configuration information of the X3 interface can include an IP address of the target to be intercepted (such as the UE), the identifier of the target to be intercepted (UE) etc.

Alternatively, in the present embodiment, the GW-C can issue the configuration information of the X3 interface to the GW-U through a single message.

Optionally, the GW-C can further allocate a connection identifier for a connection between the GW-U and the LEA, or a connection between the GW-U and the LIC, and send the connection identifier to the GW-U in the configuration information of the X3 interface, or send it to the GW-U through a separate message, which will not be limited in the present embodiment.

Wherein, the data path configuration information can include opposite end network element information, path identifier information of the opposite end network element and relevant information of the data path (such as the IP address of the UE) etc.

Step 144: the GW-U configures a data path according to the received data path configuration information; wherein, the configured data path can be a path between the GW-U and a PDN, and can also be a path between the GW-U and a RAN, or include the above two paths, which will not be limited in the present embodiment.

Optionally, if the GW-U does not receive the connection identifier which is allocated for the X3 interface by the GW-C, then the GW-U can further allocate a connection identifier for the connection between the GW-U and the LEA, or the connection between the GW-U and the LIC according to the received configuration information of the X3 interface. Of course, if the GW-U receives the connection identifier which is allocated for the X3 interface by the GW-C, then the GW-U does not need to further allocate the connection identifier.

Step 145: the GW-U sends the connection identifier to the GW-C through a response message of configuring the data path or through other separate message;

Step 146: the GW-C sends a request for establishing a connection with the X3 interface to the LEA or the LIC, which is configured to transmit data content of the target to be intercepted;

Step 147: the LEA or the LIC sends a response message of establishing the connection with the X3 interface to the GW-C;

Step 148: the GW-C returns a response message of establishing the connection for the UE;

Step 149: the GW-U intercepts uplink and downlink data transmitted by the target (i.e. the UE);

Step 1410: the GW-U copies the uplink and downlink data of the target to be intercepted, and reports data content of the target to be intercepted to the LEA or the LIC through the connection between the GW-U and the LEA or the connection between the GW-U and the LIC.

Furthermore, in the step 141, the GW-C can acquire encryption information of connection with the X3 interface during the interaction with the LEA or the LIC, and issue it to the GW-U in the step 142. Moreover, in the step 1409, the GW-U can encrypt the reported data content of the target to be intercepted, then send the data content.

Furthermore, in the step 142, the GW-C allocates the connection identifier of the X3 interface and issues it to the GW-U. In the step 1410, the GW-U reports the data content of the target to be intercepted to the LEA or LIC through the connection identifier.

Furthermore, in the step 146, the request message of establishing the connection with the X3 interface sent by the GW-C to the LEA or LIC includes the address of the GW-U, the information of the target to be intercepted and the connection identifier.

Furthermore, in the step 1410, the GW-U can recognize which is a data packet of the target to be intercepted according to the IP address of the data packet, copy the data packet, and report the data packet to the LEA or the LIC through the corresponding X3 interface.

In addition, in the present embodiment, the step 146 and the step 147 can also be executed before the step 145, which will not be limited in the present embodiment.

Embodiment Two

Figure 15:
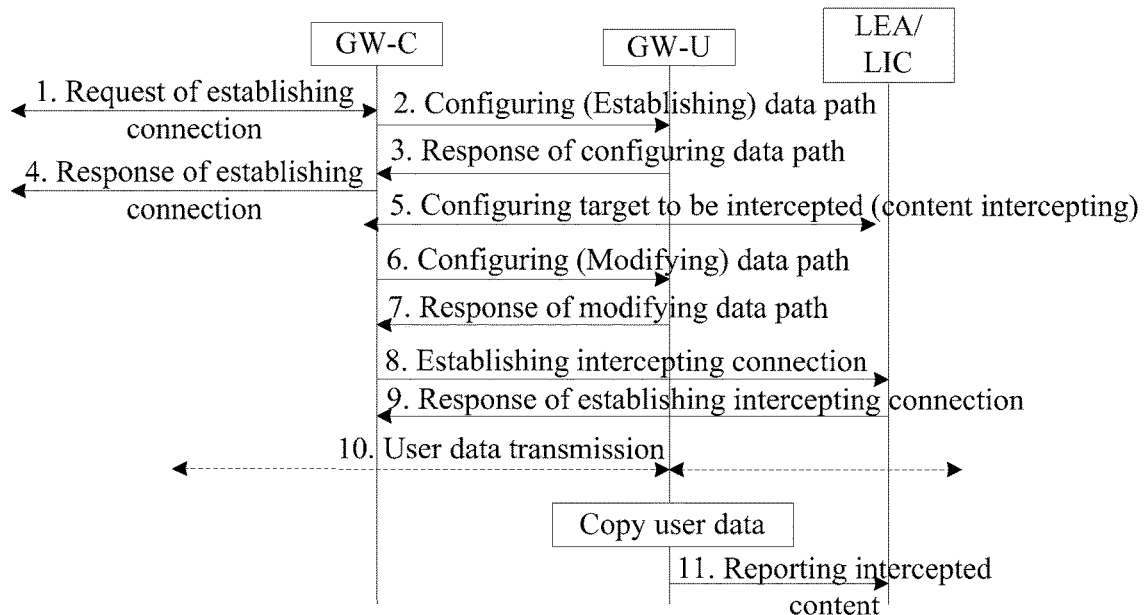
FIG. 15 is a flow diagram of a second application example provided by an embodiment of the present invention.

Please also refer to FIG. 15, which is a flow diagram of a second application example provided by an embodiment of the present invention, the difference between Embodiment Two and Embodiment One is: when the LEA or the LIC issues the configured parameters of the target to be intercepted, if the target to be intercepted has accessed the network and established a connection, then the GW-C modifies the data path configuration of the target to be intercepted, and establishes a connection of the X3 interface between the GW-U and the LEA or LIC. The process specifically includes:

Step 151: the GW-C receives a request message of establishing a connection, and allocates an IP address for an UE;

Step 152: the GW-C issues a message of configuring a data path to the GW-U; the message of configuring the data path includes the IP address;

Step 153: the GW-U configures the data path according to the received data path configuration information; (which establishes a connection between the GW-U and the LEA, or between the GW-U and the LIC);

Step 154: the GW-U sends a response message of configuring the data path to the GW-C;

wherein, in the step 151 to the step 154, when receiving the request message of establishing the connection, the GW-U allocates an IP address for the UE, and configures (establishes) the corresponding data path on the GW-U for the newly established connection.

Step 155: the GW-C receives a request message of configuring the target to be intercepted from the LEA or the LIC, the request includes the identifier of the target to be intercepted, the reporting mode and the X3 interface address of the LEA or the LIC; wherein, the reporting mode includes reporting the communication contents.

Step 156: the GW-C returns a response of configured parameters of the target to be intercepted to the LEA or the LIC.

Step 157: the GW-C issues a message of modifying the data path to the GW-U when the GW-C detects that the target to be intercepted has established a connection, the message of modifying the data path includes the data path configuration information, wherein, the data path configuration information includes: the intercepting identifier.

Optionally, the data path configuration information can further includes the configuration information of the X3 interface, the configuration information of the X3 interface includes the IP address of the target to be intercepted (UE), the identifier of the target to be intercepted (UE) etc.

Alternatively, the configuration information of the X3 interface can also be issued to the GW-U through a separate message.

Optionally, the GW-C allocates a connection identifier for the connection between the GW-U and the LEA or the connection between the GW-U and the LIC, and the connection identifier can be sent to the GW-U through the configuration information of X3 interface.

Step 158: the GW-U configures the data path according to the data path configuration information in the received message of modifying the data path.

Optionally, the GW-U allocates an identifier for the connection between the GW-U and the LEA or the connection between the GW-U and the LIC according to the configuration information of the X3 interface. The GW-U sends the connection identifier to the GW-C through a response message of configuring the data path or through other separate message.

Step 159: the GW-C initiates an establishment of a connection with the X3 interface to the LEA or the LIC, which is configured to transmit data content of the target to be intercepted.

Step 1510: the LEA or the LIC sends, to the GW-C, a response message of receiving the connection with the X3 interface.

Step 1511: the GW-U intercepts the uplink and downlink data transmitted by the target to be intercepted.

Step 1512: the GW-U copies the uplink and downlink data of the target to be intercepted.

Step 1513: the GW-U reports the data content of the target to be intercepted to the LEA or the LIC through the connection between the GW-U and the LEA or the connection between the GW-U and the LIC. For example, the data content of the target to be intercepted is reported through the X3 interface.

Optionally, on the basis of the above embodiment, in the step 155, the GW-C can acquire encryption information of the connection of the X3 interface during the interaction with the LEA or the LIC, and in the step 156, when issuing the message of modifying the data path, the GW-C can issue the encryption information to the GW-U, and can also issue the encryption information to the GW-U through other message or separate message; in the step 1512, the GW-U firstly encrypts the data content of the target to be intercepted to be reported using the encryption information, then reports the encrypted data content of the target to be intercepted.

Optionally, on the basis of the above embodiment, in an alternative step of the step 157, the GW-C allocates the connection identifier of the X3 interface, and issues it to the GW-U; in the step 1512, the GW-U reports the data content of the target to be intercepted to the LEA or the LIC using the connection identifier. Of course, the GW-U can also report the encrypted data content of the target to be intercepted to the LEA or the LIC using the connection identifier.

Optionally, on the basis of the above embodiment, in the step 159, the request message of initiates an establishment of a connection with the X3 interface sent by the GW-C to the LEA or LIC can include the address of the GW-U, information of the target to be intercepted and the identifier of the connection, but it is not limited to this.

Optionally, on the basis of the above embodiment, in the step 1512, the GW-U can recognize that it is a data packet of the target to be intercepted according to the IP address of the data packet and copy the data packet, and report the data packet to the LEA or the LIC through the corresponding X3 interface.

Embodiment Three

Figure 16:
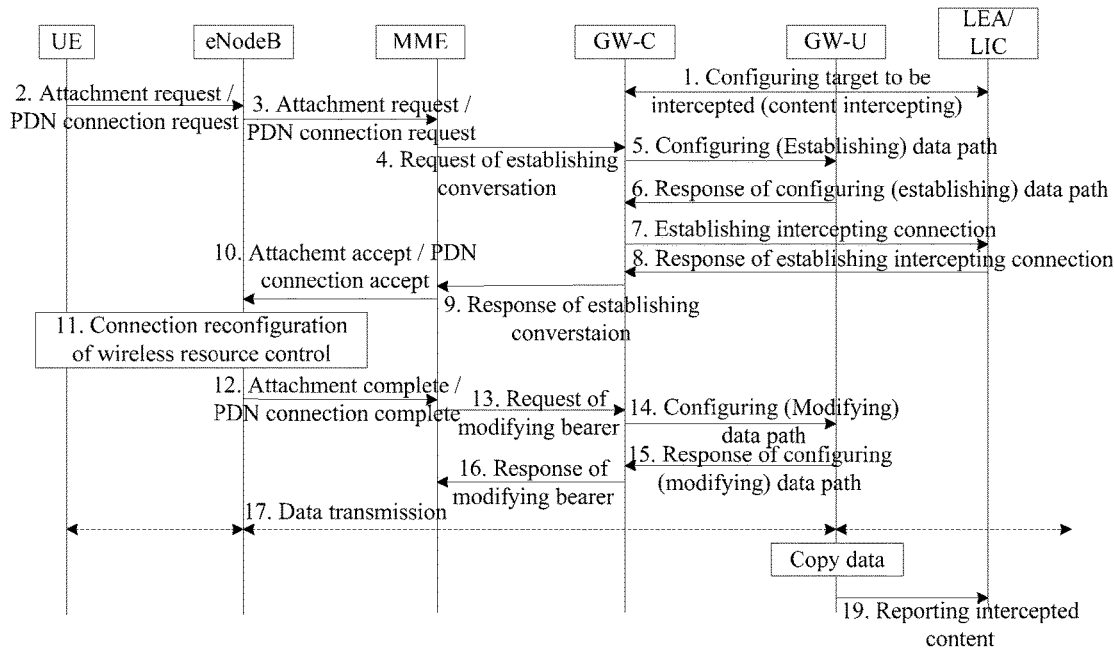
FIG. 16 is a flow diagram of a third application example provided by an embodiment of the present invention.

Please refer to FIG. 16, which is a flow diagram of a first application example of a method for intercepting user data provided by an embodiment of the present invention, and an example under an SAE network architecture is taken in the present embodiment. The embodiment involves a collection of an attachment procedure and a procedure of a PDN connection request of the UE. Wherein the message names corresponding to the attachment procedures in steps 161, 162, 169 and 1611 include "attachment", and the message names corresponding to the procedures of a PDN connection request of the UE include "PDN connection". The detailed procedure of intercepting user data specifically includes:

Step 161: the GW-C receives a request message of configuring the target to be intercepted sent by the LEA or the LIC, the request message of configuring the target to be intercepted includes identifier information of the target to be intercepted, a reporting mode and an address of an X3 interface of the LEA or the LIC; wherein, the reporting mode includes reporting communication content; the GW-C returns a response message of the request message of configuring the target to be intercepted to the LEA or the LIC, that is, returns a response message of configuring parameters of the target to be intercepted.

Step 162: the UE sends an attachment request message or a PDN connection request message to an evolved NodeB (eNodeB);

Step 163: the eNodeB sends the attachment request message or the PDN connection request message of the UE to an MME.

Step 164: the MME sends a request message of establishing a conversation to the GW-C;

Step 165: the GW-C allocates an IP address for the UE; if the GW-C determines that the conversation is established by the target to be intercepted, then issues a message of configuring (establishing) a data path to a GW-U;

wherein, the message of configuring the data path includes: an interception identifier;

further, the message of configuring the data path can further include: configuration information of the X3 interface; of course, the configuration information of the X3 interface can be sent to the GW-U through a separate message, which will not be limited in the present embodiment.

Wherein, the configuration information of X3 interface includes the IP address of the target to be intercepted (UE), identifier of the target to be intercepted (UE) etc.

Optionally, the GW-C can further allocate a connection identifier to the connection between the GW-U and the LEA or the connection between the GW-U and the LIC, and send the connection identifier to the GW-U through the configuration information of the X3 interface; and can also send the connection identifier to the GW-U through a separate message, which will not be limited in the present embodiment.

Step 166: the GW-U establishes a data path for data transmission when receiving the message of configuring (establishing) the data path;

when receiving the configuration information of the X3 interface, the GW-U can use the connection identifier in the received configuration information of the X3 interface, or can allocate a connection identifier for the connection between the GW-U and the LEA or the connection between the GW-U and the LIC; then, the GW-U sends the connection identifier to the GW-C through a response message of configuring the data path or through other separate message; the GW-U returns a response message of configuring (establishing) the data path to the GW-C.

Step 167: the GW-C initiates a request for establishing a connection with the X3 interface to the LEA or the LIC, and the connection is configured to transmit data content of the target to be intercepted;

Step 168: the LEA or the LIC sends a response message of establishing the connection with the X3 interface to the GW-C;

Step 169: the GW-C returns to the MME a response message of establishing a conversation of the request message of establishing a conversation.

Step 160: the MME sends an attachment accept message or a PDN connection accept message to the eNodeB;

Step 1611: the eNodeB and the UE perform a procedure of wireless resource control connection reconfiguration.

Step 1612: the eNodeB sends an attachment complete message or a PDN connection complete message to the MME;

wherein, the message includes: opposite end network element information (such as IP address etc.) of the eNodeB and the data path identifier information (such as TED etc.) of the opposite end of the eNodeB.

Step 1613: the MME sends a request message of modifying a bearer to the GW-C; the request message of modifying a bearer carries the opposite end network element information;

Step 1614: the GW-C sends a request message of configuring (modifying) a data path to the GW-U when receiving the request message of modifying a bearer, the request message of configuring a data path includes the opposite end network element information and the data path identifier information of the opposite end;

Step 1615: the GW-U updates the opposite end network element information and the data path identifier information of the opposite end in the configuration information of the data path which has already been established when receiving the request message of configuring (modifying) the data path;

Step 1616: the GW-U returns a response message of configuring (modifying) the data path to the GW-C;

Step 1617: the GW-C returns a response message of modifying the bearer to the MME;

Step 1618: the GW-U intercepts uplink and downlink data transmitted by the target to be intercepted (UE).

Step 1619: the GW-U copies the uplink and downlink data of the target to be intercepted.

Step 1620: the GW-U reports content of the uplink and downlink data of the target to be intercepted to the LEA or the LIC through the connection (such as the X3 interface) between the GW-U and the LEA or between the GW-U and the LIC.

In the present embodiment, it is particularly noted that, the steps 167 and 168 can be executed before the step 166, or can be executed after the step 1616 and the before step 1617.

If the steps 167 and 168 are after the step 1617, the GW-C receives a message of configuring the target to be intercepted and the target to be intercepted has completed the attachment procedure or the PDN connection procedure, then the intercepting procedure of establishing the data path can be referred to steps 155-1513 in FIG. 15, which will not be described here.

Figure 17:
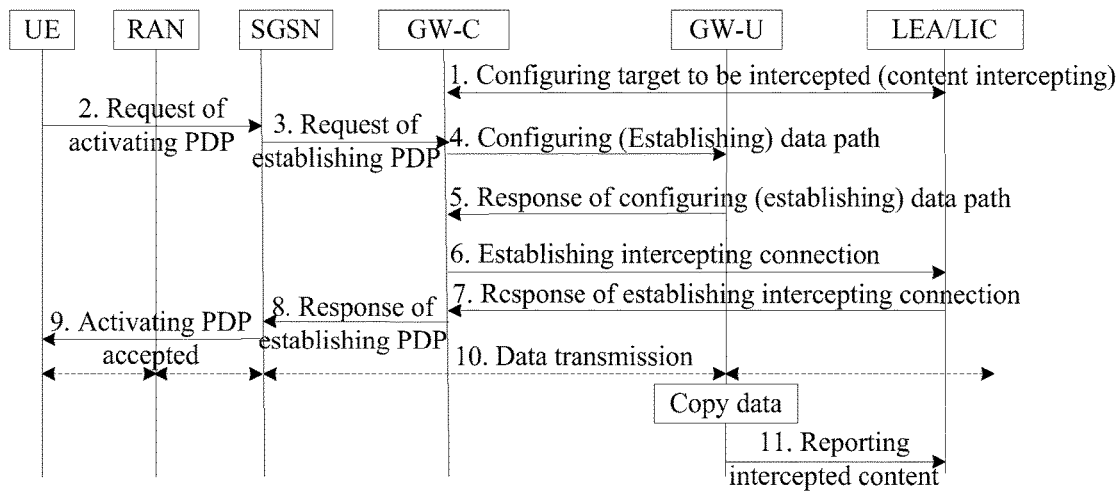
FIG. 17 is a flow diagram of a fourth application example provided by an embodiment of the present invention.

Please refer to FIG. 17, which is a flow diagram of a second application example of a method for intercepting user data provided by an embodiment of the present invention, and an example under a GPRS network architecture is taken in the present embodiment, an intercepting procedure of a PDP of a target to be intercepted specifically includes:

Step 171: the GW-C receives a request message of configuring a target to be intercepted sent by an LEA or an LIC, the request message of configuring the target to be intercepted includes identifier information of the target to be intercepted, a reporting mode and an address of an X3 interface of the LEA or the LIC. Wherein, the reporting mode includes reporting communication content. The GW-C returns a response message of the request message of configuring the target to be intercepted to the LEA or the LIC, that is, the GW-C returns a response of configuring parameters of the target to be intercepted;

Step 172: the UE (mobile station MS) sends a request message of activating the PDP to an SGSN;

Step 173: the SGSN sends a request message of establishing the PDP to the GW-C;

Step 174: the GW-C allocates an IP address for the UE when receiving the request message of establishing the PDP;

Step 175: the GW-C sends a message of configuring (establishing) a data path to the GW-U, wherein, the message of configuring (establishing) the data path carries at least a piece of configuration information of the data path, the configuration information of the data path includes information of the present network element (GW-U) (optional), information of the data path (opposite end network element information of the SGSN and an identifier of the data path of the opposite end) and information relevant to the data path (IP address of the UE). In general, the data path message carries at least one piece of configuration information of a data path which is connected to an RAN.

In the present step, if the GW-C determines that the request message of establishing the PDP is a connection established by the target to be intercepted, then issues a message of configuring (establishing) the data path to the GW-U; the data path message can further include the target to be intercepted;

Further, the message of configuring the data path can further include: configuration information of the X3 interface;

Step 176: the GW-U establishes a data path for data transmission when receiving the message of configuring (establishing) the data path;

Optionally, if the message of configuring (establishing) the data path received by the GW-U includes the configuration information of the X3 interface, then the GW-U allocates a connection identifier for the connection between the GW-U and the LEA or the connection between the GW-U and the LIC according to the configuration information of the X3 interface. The GW-U sends the connection identifier to the GW-C through a response message of configuring the data path or through other separate message.

Step 177: the GW-U returns a response message of configuring (establishing) the data path to the GW-C;

Step 178: the GW-C initiates a request for establishing a connection with the X3 interface to the LEA or the LIC, and the connection is configured to transmit data content of the target to be intercepted;

Step 179: the LEA or the LIC sends a response message of establishing the connection with the X3 interface to the GW-C;

Step 1710: the GW-C sends a response message of establishing the PDP of the request message of establishing the PDP to the SGSN;

wherein, the response message of establishing the PDP includes: information (IP address) of the opposite end network element (GW-U), data path identifier information (TEID of the GW-U) of the opposite end network element and the IP address of the UE.

Step 1711: the SGSN sends a message of activating PDP accepted to the UE (MS) when receiving the response message of establishing the PDP;

step 1712: intercepting uplink and downlink data transmitted by the target to be intercepted (UE);

Step 1713: the GW-U copies the uplink and downlink data of the target to be intercepted.

Step 1714: the GW-U reports content of the uplink and downlink data of the target to be intercepted to the LEA or the LIC through the connection between the GW-U and the LEA or the connection between the GW-U and the LIC.

In the present embodiment, it is noted that, the steps 178 and 179 can be executed before the step 177, or can be executed after the step 1710 and before the step 1712.

If it is after the step 1712, the GW-C receives a message of configuring the target to be intercepted and the target to be intercepted has completed the PDP establishing procedure, then the intercepting procedure can be referred to steps 155-1513 in FIG. 15, which will not be described here.

In an embodiment of the present invention, the data content of the target to be intercepted is reported by the GW-U to the LEA or the LIC, which can significantly reduce the data forwarding flow between the GW-C and the GW-U, simplify complexity of the GW-C, improve performance of the GW-C and reduce cost.

In embodiments of the present invention, the UE can be any one of the followings, which can be static or mobile, the static UE can specifically be a terminal, a mobile station, a subscriber unit or a station etc., the mobile UE can specifically include a cellular phone, a personal digital assistant (PDA), a modem, a wireless communication device, a handheld device, a laptop computer, a cordless phone or a wireless local loop (WLL) etc., the above UEs can be distributed over the whole wireless network.

It should be noted that, in this paper, terms representing relationship such as "first" and "second" and so on are only used to distinguish an entity or an operation from another entity or another operation, rather than used to indicate or imply that these entities or operations should have any actual relationship or order therebetween. Moreover, terms "include", "involve" or their equivalents are intended to cover a non-exclusive meaning of include, so as to let the procedure, method, product or device, which includes a series of elements, include these series of elements as well as other elements which are not specifically listed, or further include the inherent elements of the procedure, method, product or device. If there is no further limit, the element defined by a sentence "includes one . . . " does not exclude other equivalent elements further existing in the procedure, method, product or device which includes the element.

Through the description of the above embodiments, those skilled in the art can clearly understand that the present disclosure may be implemented by software as well as a necessary universal hardware platform, or, definitely, implemented by hardware, and in many cases, the former is more preferred. Based on this understanding, the essence of the technical solution of the present invention or the part contributing to the conventional art may be realized in the software product form. The computer software product can be stored in a storage medium, such as a ROM/RAM, a floppy disk, or an optical disk, and includes several instructions adapted to enable a computer device (such as a personal computer, a server, or a network device) to execute the method according to each embodiment or certain parts of the embodiments of the present invention.

The above are preferred embodiments of the present invention, and it must be pointed out that various improvements and modifications can be made herein without departing from the principle of the present invention to those ordinary skilled in the art, and the improvements and modifications should fall within the protection scope of the present invention.

What is claimed is:

1. A method for intercepting user data comprising:
sending, by a control plane entity, data path configuration information to a user plane entity;
receiving, by the user plane entity, the data path configuration information from the control plane entity,
wherein the data path configuration information comprises identifier information of a target to be intercepted and an interface address of an intercepting entity;
establishing, by the user plane entity, a path for data transmission according to the data path configuration information;
sending, by the control plane entity, a connection identifier of an intercepting interface for the path to the user plane entity;
receiving, by the user plane entity, the connection identifier from the control plane entity;
intercepting, by the user plane entity, data transmitted by the target to be intercepted on the path; and
sending, by the user plane entity, the data to the intercepting entity through the interface address according to the connection identifier.

2. The method according to claim 1, wherein the identification information of the target and the interface address of the intercepting entity are received through different messages.

3. The method according to claim 1, wherein after receiving the data path configuration information and in response to establishment of a connection of the target to be intercepted, the method further comprises:

receiving, by the user plane entity, modified data path configuration information from the control plane entity; and
modifying, by the user plane entity, a path for data transmission which has been established according to the modified data path configuration information.

4. The method according to claim 1, further comprising:
receiving, by the user plane entity, encryption information from the control plane entity;
encrypting, by the user plane entity, intercepted data using the encryption information; and
wherein sending the data to the intercepting entity comprises: sending, by the user plane entity, the encrypted data to the intercepting entity through an intercepting connection.

5. The method according to claim 1, wherein the interface address is an address of an X3 interface on the user plane entity.

6. An apparatus for intercepting user data comprising:
a processor;
a receiver configured to cooperate with the processor to receive the following from a control plane entity: data path configuration information and a connection identifier of an intercepting interface for a path for data transmission,
wherein the data path configuration information comprises identifier information of a target to be intercepted and an interface address of an intercepting entity;
the processor configured to establish the path for data transmission according to the data path configuration information and intercept data transmitted by the target to be intercepted on the path; and
a transmitter configured to cooperate with the processor to send the data to the intercepting entity through the interface address according to the connection identifier.

7. The apparatus according to claim 6, wherein the identification information of the target and the interface address of the intercepting entity are received through different messages or a same message.

8. The apparatus according to claim 6, wherein after the data path configuration information is received and in response to establishment of a connection of the target to be intercepted, the receiver is further configured to receive modified data path configuration information from the control plane entity; and the processor is further configured to modify a path for data transmission which has been established according to the modified data path configuration information.

9. The apparatus according to claim 6, wherein the receiver is further configured to receive encryption information from the control plane entity; the processor is further configured to encrypt intercepted data using the encryption information; the transmitter is further configured to send the encrypted data to the intercepting entity through an intercepting connection.

10. The apparatus according to claim 6, wherein the interface address is an address of an X3 interface on the apparatus.

11. The apparatus according to claim 6, wherein the apparatus is a user plane entity.

12. The method according to claim 1, wherein the control plane entity sends the data path configuration information to the user plane entity in response to a connection of the target to be intercepted not being established.

13. The apparatus according to claim 6, wherein the receiver is further configured to receive the data path configuration information in response to a connection of the target to be intercepted not being established.

14. An apparatus for intercepting user data comprising:
- a processor configured to acquire identification information of a target to be intercepted and an interface address of an intercepting entity, and configure data path configuration information comprising the identification information of the target and the interface address of the intercepting entity; and
- a transmitter configured to cooperate with the processor to send the data path configuration information to a user plane entity, and send a connection identifier of an intercepting interface for a path for data transmission to the user plane entity.

15. The apparatus according to claim 14, wherein the processor is further configured to initiate an establishment of an intercepting connection of an X3 interface to the intercepting entity.

16. The apparatus according to claim 14, wherein the processor is further configured to allocate the connection identifier.

17. The apparatus according to claim 14, wherein the identification information of the target and the interface address of the intercepting entity are sent through different messages or a same message.

18. The apparatus according to claim 14, wherein the transmitter is further configured to send the data path configuration information to the user plane entity when a connection of the target to be intercepted is not established.

19. The apparatus according to claim 14, wherein the apparatus is a control plane entity.

20. The method according to claim 1, further comprising:
- obtaining, by the control plane entity, the identifier information of the target to be intercepted and the interface address of the intercepting entity from the intercepting entity.

* * * * *